(12) United States Patent
Croxford (10) Patent No.: US 11,841,798 B2
(45) Date of Patent: Dec. 12, 2023

(54) SELECTIVE ALLOCATION OF MEMORY STORAGE ELEMENTS FOR OPERATION ACCORDING TO A SELECTED ONE OF MULTIPLE CACHE FUNCTIONS

(71) Applicant: Arm Limited, Cambridge (GB)

(72) Inventor: Daren Croxford, Swaffham Prior (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 17/397,100

(22) Filed: Aug. 9, 2021

(65) Prior Publication Data

US 2023/0041508 A1    Feb. 9, 2023

(51) Int. Cl.
  *G06F 12/0811* (2016.01)
  *G06F 12/02* (2006.01)
  *G06F 1/26* (2006.01)

(52) U.S. Cl.
  CPC ............ *G06F 12/0811* (2013.01); *G06F 1/26* (2013.01); *G06F 12/0223* (2013.01); *G06F 2212/1024* (2013.01)

(58) Field of Classification Search
  None
  See application file for complete search history.

(56) References Cited

U.S. PATENT DOCUMENTS

| | | | | |
|---|---|---|---|---|
| 2004/0078526 | A1* | 4/2004 | Zhang | G06F 12/128 |
| | | | | 711/134 |
| 2010/0275049 | A1* | 10/2010 | Balakrishnan | G06F 1/3203 |
| | | | | 713/324 |
| 2014/0075118 | A1* | 3/2014 | Biswas | G06F 12/0871 |
| | | | | 711/E12.017 |
| 2017/0177492 | A1* | 6/2017 | Loh | G06F 12/0811 |
| 2017/0365600 | A1* | 12/2017 | Sinha | H01L 24/73 |
| 2021/0357328 | A1* | 11/2021 | Abed | G06F 12/128 |
| 2021/0365376 | A1* | 11/2021 | Roberts | G06F 12/0897 |

OTHER PUBLICATIONS

Three-dimensional integrated circuit, Wikipedia, Jun. 1, 2021, 18 pages.

* cited by examiner

*Primary Examiner* — William E. Baughman
(74) *Attorney, Agent, or Firm* — NIXON & VANDERHYE P.C.

(57) ABSTRACT

Circuitry comprises processing circuitry to access a hierarchy of at least two levels of cache memory storage; memory circuitry comprising plural storage elements, at least some of the storage elements being selectively operable as cache memory storage in respective different cache functions; and control circuitry to allocate storage elements of the memory circuitry for operation according to a given cache function.

19 Claims, 6 Drawing Sheets

| Tag | Cache line 0 |
|---|---|
| Tag | Cache line 1 |
| Tag | Cache line 2 |
| Tag | Cache line 3 |
| Tag | Cache line 4 |
| Tag | Cache line 5 |
| Tag | Cache line 6 |
| Tag | Cache line 7 |

Set 0: lines 0-3
Set 1: lines 4-7

SELECTIVE ALLOCATION OF MEMORY STORAGE ELEMENTS FOR OPERATION ACCORDING TO A SELECTED ONE OF MULTIPLE CACHE FUNCTIONS

BACKGROUND

This disclosure relates to circuitry and methods.

Some circuit designs such as integrated circuit designs make use of cache memories to provide intermediate storage between a processor or other device that performs memory accesses and a main memory, often with the aim of improving an average access time, energy efficiency and bandwidth for information stored in the main memory. Examples of such devices that perform memory accesses may include any of: central processing units (CPUs), graphics processing units (GPUs), neural processing units (NPUs), digital signal processors (DSPs), image signal processors (ISPs), video accelerators, hardware accelerators or simply devices that manipulate data stored in memory such as DMA controllers or other peripheral devices making use of DMA. The term "processor" as used below may encompass any one or more of these example devices.

In some examples, a hierarchical structure of cache memories may be used, often expressed using a numbering system such that a "level 1 cache" is generally a smaller and faster cache memory disposed closest to the processor, with higher numbered levels representing cache memories which are potentially larger and which are searched for a required data item if that data item is not found in the level 1 cache.

It is in this context that the present disclosure arises.

SUMMARY

In an example arrangement there is provided circuitry comprising processing circuitry to access a hierarchy of at least two levels of cache memory storage; memory circuitry comprising plural storage elements, at least some of the storage elements being selectively operable as cache memory storage in respective different cache functions; and control circuitry to allocate storage elements of the memory circuitry for operation according to a given cache function.

In another example arrangement there is provided a method comprising: accessing a hierarchy of at least two levels of cache memory storage; and allocating storage elements of memory circuitry comprising plural storage elements, at least some of the storage elements being selectively operable as cache memory storage in at least two respective different cache functions, for operation as a given cache memory function.

Further respective aspects and features of the present disclosure are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Circuitry Overview

Figure 1:
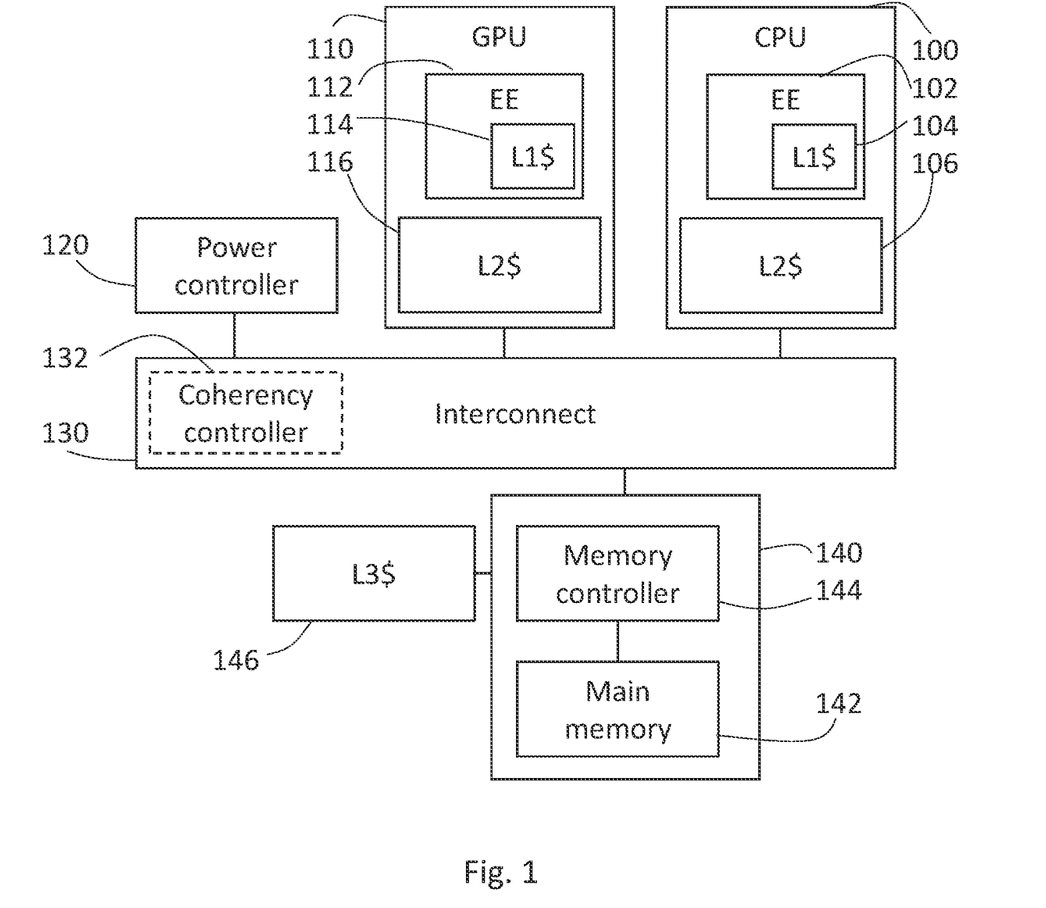
FIG. 1 schematically illustrates data processing circuitry.

FIG. 1 schematically illustrates an example of data processing circuitry comprising a central processing unit (CPU) 100, a graphics processing unit (GPU) 110, a power controller 120, interconnect circuitry 130 and a main memory 140.

In operation, each of the CPU 100 and the GPU 110 may perform respective processing tasks and more generally may be any device defined as a "processor" in the discussion above, and/or one or more other devices falling in this definition may be provided. For example, tasks performed by the CPU 100 may relate to control operations and tasks performed by the GPU 110 may relate to data handling operations such as image or video data rendering. However, this is just one example and other types of operations may be performed. Indeed, the use of a CPU 100 and GPU 110 is also just one schematic example and other types of and/or numbers of processors may be employed.

In the example shown, each of the CPU 100 and the GPU 110 comprises respective execution engine (EE) circuitry 102, 112 having an associated level 1 cache memory (abbreviated to L1$ in the diagram) 104, 114 and an associated level 2 cache memory (L2$) 106, 116. The main memory 140 comprises memory circuitry 142, a memory controller 144 to control access to and from the memory circuitry 142 and is associated with a level 3 cache memory (L3$) 146.

The various cache memories shown in FIG. 1 form a hierarchy, so that if a respective execution engine circuitry 102, 112 requires access to a data item (which may represent a processing instruction and/or data to be handled by a processing instruction) it will try first to obtain or access that data item in the level 1 cache memory. In the case of a cache miss a search will be performed through the next closest cache memory levels, with an access to the memory circuitry 142 of the main memory being used only if the attempted cache memory accesses all miss. When the required data item is obtained from the memory circuitry 142 a copy may be saved in one or more of the cache memories.

In some examples, for a write, the system may fetch the line (as a "line fill") and then allocate that line in a cache. A write can then be performed into the line. Alternatively, a line can be allocated in the cache, and data written into the line. However, in this case (unless the entire line is written) there may be a need to keep information indicating which portions of the line were written (and which portions were not).

Although they are drawn as single respective entities the processors 100, 110 may in fact be embodied as multiple core processors or clusters. For example, there may be 8×CPU and/or 16×GPU. Depending upon the workloads some or all of the processors may be powered down and/or idle. In such instances the respective cache in the device 100, 110 may be made up of a number of portions or "slices". So, for example slice 1 of GPU L2$ may be associated with GPU processors 1-8, and slice 2 of GPU L2$ may be associated with GPU processors 9-16. The reallocation techniques to be discussed below may apply as between such slices.

In general terms, the level 1 cache memory is normally implemented to be electrically close to the respective processing circuitry and (in part due to its proximity) to provide rapid (low latency) and potentially energy efficient access to data stored by that cache memory. In previously proposed examples, the level 2 cache memory may be electrically further from the respective processing circuitry but may also be larger than the level 1 cache memory, and the level 3 cache memory may be electrically further still but also potentially larger still than the level 2 cache memory. It is also noted that in the example of FIG. 1, the CPU 100 and the GPU 110 each have their own respective level 1 and level 2 cache memories.

Accessing data from a cache memory cannot only reduce memory latency, it can also reduce memory access power consumption compared to accessing the same data from a main memory.

The interconnect circuitry 130 provides for data and other communication between the various nodes 100, 110, 120, 140 connected to the interconnect circuitry. The interconnect circuitry may also optionally provide a coherency controller 132. In such example arrangements, the interconnect circuitry may be an example of so-called cache coherent interconnect circuitry. Here, the term "coherent" refers to the maintenance of a correct relationship between multiple copies of the same data stored across the whole system. For example, data may be stored in a memory device (such as a L1$ or L2$ at one of the data handling nodes (such as the CPU 100). Other nodes (such as the GPU 110) may (as described) have their own respective caches which, depending on the nature of the processing element operations, may store one or more copies of data which is also held at the CPU 100. In the case of a data handling access by one node to such information, there is a need to ensure that the accessing node is accessing the latest version of the stored information, and that if it makes any alteration to the stored information, either the other versions are correctly altered themselves or the other versions are deleted or invalidated. The interconnect circuitry 130 and potentially circuitry in the coherent caches may include various mechanisms and circuitry to provide for such coherent operation.

Note that in FIG. 1, a single interconnect is shown. However, in other embodiments there may be multiple interconnects, and indeed multiple main memories.

The role of circuitry associated with the cache coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then cache coherence logic avoids conflicts with other existing copies of the data item. Techniques for achieving this can include the use of a so-called snoop filter.

The term "snoop filter" is a historical one and is used here to refer to a control device having an associated "directory", where the directory stores information indicating which data is stored in which cache, and the snoop filter itself at least contributes to the handling of data accesses to cached information so as to provide a cache coherence function.

The coherency controller may include a snoop filter. The coherency controller may optionally provide other functionality. The snoop filter can provide some or all of the functionality relating to overseeing the handling of data accesses across a cache coherent system. Therefore, in some examples, the snoop filter can be considered as a coherency controller.

As an optional variation, the coherency control functionality (potentially including snoop filter functionality) can be provided at one or both of the CPU 100 and the GPU 110 instead of, or in addition to, being provided (as 132) at the interconnect circuitry 130.

The power controller 120 can operate to control the supply of electrical power to two or more respective so-called power domains so as to enable or to power-down various portions of the circuitry of FIG. 1 in dependence upon a prevailing requirement based on current processing needs. Therefore, the power control circuitry may be configured to selectively enable or disable the processing units for operation; and may be configured to generate a control indication to control circuitry (discussed below) in dependence upon which of the processing units are currently enabled or disabled for operation. The power control circuitry may be configured to selectively enable or disable one or more of the cache levels for operation.

Finally, with respect to FIG. 1, it is noted that in at least some examples, the level 2 cache 116 of the GPU 110 may have generally similar requirements to the level 3 cache 146 (which may also be known as a system level cache or SLC), such as one or more of: high associativity, large size, ability to handle relatively high latency, high throughput, physical addressing and potentially including a snoop filter. At least some of the cache memories shown in FIG. 1 may be implemented using techniques to be discussed in more detail below.

The present techniques are not limited to particular types of processor, and CPUs and GPUs are merely examples. Other examples may include neural processing units.

3DIC Example

At least some examples of the present technology may be implemented using so-called three-dimensional integrated circuit (3DIC) technology. It is noted, however, that the use of 3DIC technology relates only to examples and is not a requirement for the implementation of the present technology.

3DIC technology is described by en.wikipedia.org/wiki/Three-dimensional_integrated_circuit, the contents of which are hereby incorporated into the present description by reference.

Figure 2:
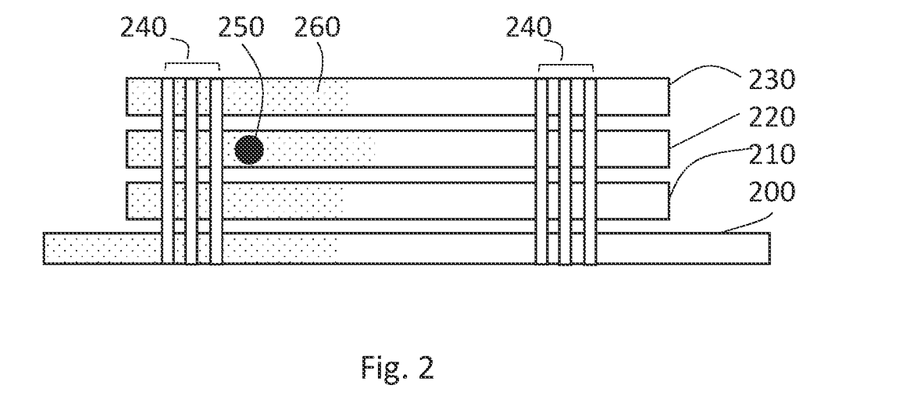
FIG. 2 schematically illustrates a so-called three-dimensional integrated circuit (3DIC) arrangement.

FIG. 2 schematically illustrates an example 3DIC arrangement, comprising a set or stack of semiconductor substrates 200, 210, 220, 230 which overlie one another in a direction (such as a z direction, vertically as drawn) which may be perpendicular to the (x, y) plane of each substrate. The substrate may be, for example, formed of silicon wafers or dies having metal-oxide semiconductor (MOS) circuit elements formed on the substrates. Electrical connections between the respective substrates can be provided by, for example, through-silicon vias (TSVs) shown in schematic form 240 in FIG. 2. In some examples, each of the substrates 200, 210, 220, 230 may carry portions of the different nodes shown in FIG. 1, or in other examples a given substrate may be dedicated to (for example) memory circuitry and associated interface circuitry with another substrate being dedicated to (for example) processing circuitry or the like.

As well as achieving potentially a high density of electronic circuitry in a given packaged volume, 3DIC devices can also potentially provide features which are particularly relevant to the present description. To illustrate this, a schematic location 250 is illustrated in FIG. 2 in an example substrate 230 of the set of substrates. In contrast to the use of a single substrate in a non-3DIC arrangement, where in order for electronic components to be within a given electrical distance of one another they are limited to nearby locations in the plane of that single substrate, in a 3DIC arrangement components in another one of the substrates may also be electrically close to the example location 250, as illustrated by the shaded area 260. This in turn potentially provides more scope (compared to a single substrate arrangement) for memory circuitry to be electrically close to processing circuitry, potential advantages of such electrical proximity being that signals may have a shorter propagation latency, and the arrangement may be more energy efficient.

In connection with the present examples, it is possible using techniques such as those relating to 3DIC technology for a set of storage elements for which at least a default allocation relates to different cache memories (for example, GPU L2$ and L3$ as drawn in FIG. 1) to be electrically substantially equidistant from devices to which they may potentially be connected under different reallocation schemes, so that there is substantially no net performance overhead in reallocating them from one such usage to another. Similarly, they can be formed or fabricated using substantially similar or the same type of memory cells so that once again their use in either or any of the potential allocation schemes has substantially similar performance.

Memory Circuitry Allocation—Overview

Examples of the present technology provide circuitry comprising processing circuitry (such as 100, 110) to access a hierarchy of at least two levels or functions of cache memory storage (such as 104, 106, 114, 116, 146). Here, a cache "function" can refer to a cache level and/or a connection or association with a particular processor. So, for example, operation as GPU L2$ and CPU L2$ are different cache functions, as are operation as (any) L2$ and (any) L3$.

Figure 3:
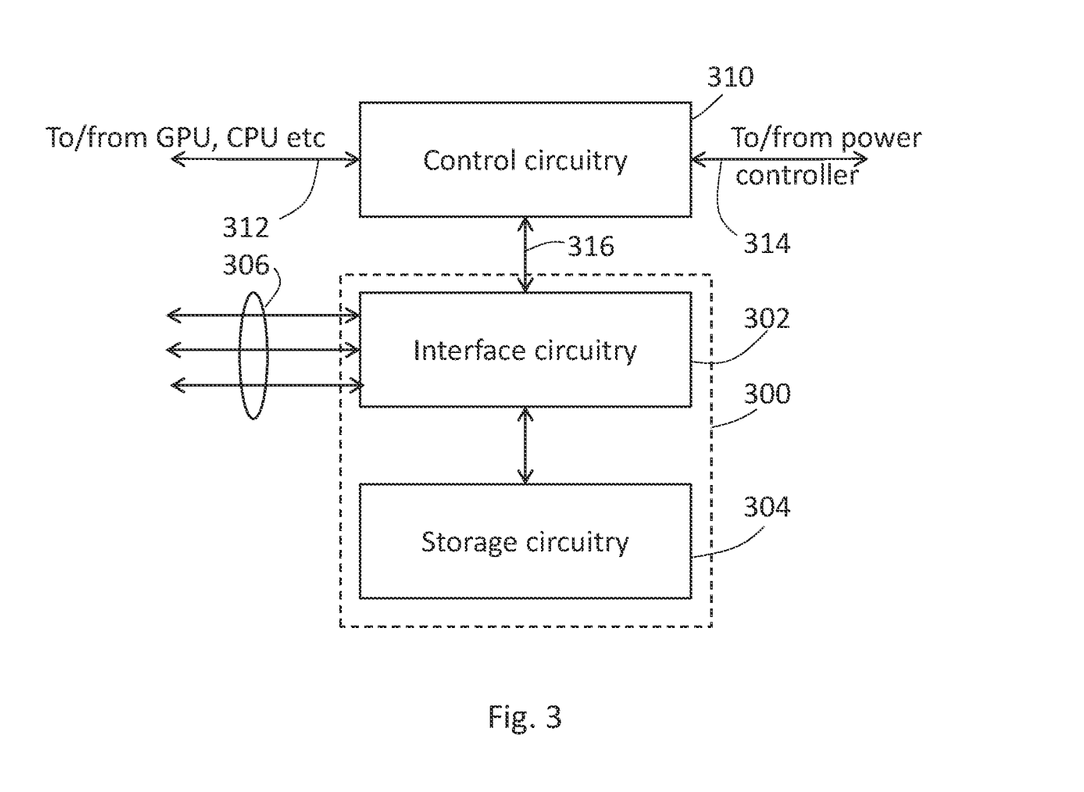
FIG. 3 schematically illustrates aspects of a cache memory circuitry.

As shown schematically in FIG. 3, at least some of the hierarchy of cache memory storage may be implemented by memory circuitry 300 comprising plural storage elements, at least some of the storage elements being selectively operable as cache memory storage in at least two of the cache functions; and control circuitry 310 to allocate storage elements of the memory circuitry for operation as a given cache function of the cache memory storage.

The allocation of storage elements of the memory circuitry 300 to serve as different cache memories may be carried out under the control of the control circuitry 310, for example in response to factors such as:

- a direct instruction from the CPU, the GPU or the like;
- data received from the power controller 120;
- data indicative of current utilisation or usage of the CPU, GPU or parts of these;
- data indicative of a type of processing task being undertaken by the GPU, CPU or the like;
- data indicative of cache memory usage or performance such as locality, access rate, hit rate, miss rate, security status or the like; and/or
- the results of one or more temporary or quasi-permanent trial reallocations coupled with a detection of their effect upon cache and/or processing performance.

Further examples of at least some of these factors will be discussed in more detail below.

In order to communicate with the GPU, CPU and/or power controller, the control circuitry 310 is provided with interfaces 312, 314 to these circuitries. The control circuitry 310 also has a control interface 316 to/from the memory circuitry 300 to provide for: (a) controlling the memory circuitry 300 to act as a required cache memory or cache function; and/or (b) receiving information from the memory circuitry 300 indicative of cache memory usage as discussed above.

As mentioned, the memory circuitry 300 comprises interface circuitry 302 which selectively provides an interface 306 applicable to operation of the memory circuitry 300 or at least a part of it as a cache function (such as a particular type and/or level of cache memory). For example, the interface 306 may provide a selectable interface to the GPU and a selectable interface to the CPU in order that the storage circuitry 304 or at least a part of it may act as a CPU cache or a GPU cache. In at least some non-limiting examples, a typical reallocation scenario involves reallocation as between any of the CPU (L2) cache, GPU (L2) cache and L3 cache.

The storage circuitry 304 can comprise an array or other arrangement of storage elements such that some or all of the array can be allocated to act as a particular cache function such as type and/or level of cache memory. Further examples of the storage circuitry in connection with operation as a set-associative cache memory are discussed below.

Therefore, in the example of FIG. 1 and using these techniques, the processing circuitry comprises a plurality of processing units, and the control circuitry is configured to selectively allocate storage elements for connection as cache memory to selected ones of the plurality of processing units.

Default Cache Levels

Figure 4:
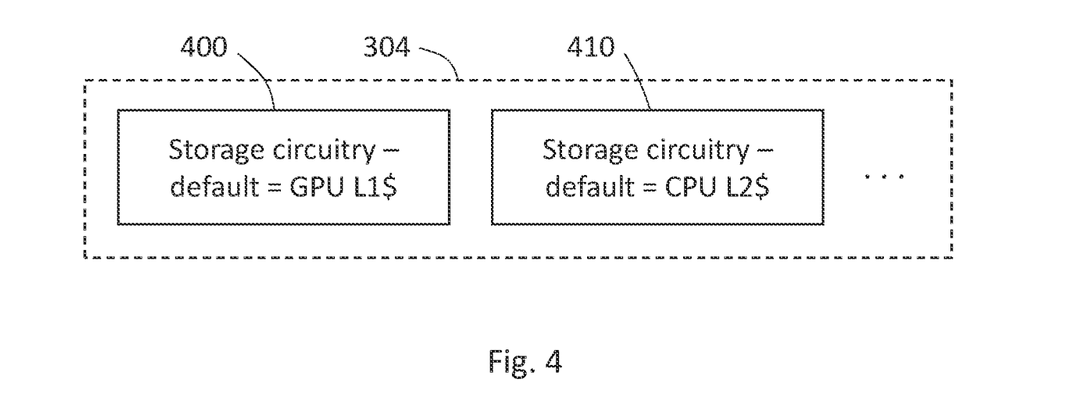
FIG. 4 schematically illustrates a default allocation arrangement.

As shown schematically in FIG. 4, the storage circuitry 304 can be arranged as respective portions 400, 410 and so on which each have a default allocation to a respective cache function, for example on system power up or boot. In the example shown, a portion 400 has a default allocation as the GPU L1$, a portion 410 has a default allocation as the CPU L2$ and so on. Note that although reallocation of L1$ is not excluded, example embodiments primarily envisage reallocation as taking place between instances of L2$ and L3$.

Note that at least some of the hierarchy of cache memory may have a fixed allocation which is not in fact alterable by the control circuitry 310. Example arrangements encompass an overall system having some fixed cache memories and some configurable cache memories using the techniques described here. Other examples encompass a system having a pool of storage elements which can be configured or allocated using the present techniques to any one of the cache functions described here, albeit potentially with a default allocation which can then be deviated from by the control circuitry 310.

Therefore, in these examples, the control circuitry 310 may be responsive to (i) a default cache function associated with a given storage element; and (ii) receipt of a control indication (for example from the GPU, CPU, power controller or a cache memory itself) to request the control circuitry to allocate the given storage element to a cache function different to the default cache function.

Set-Associative Cache Memory Examples

FIGS. 5 to 8 provide schematic examples relating to a so-called set-associative cache memory.

Any of the cache memories shown in FIG. 1 could be set-associative but in the present example, this arrangement is particularly applicable to the GPU L2$ and the L3$ (SLC).

Figure 5:
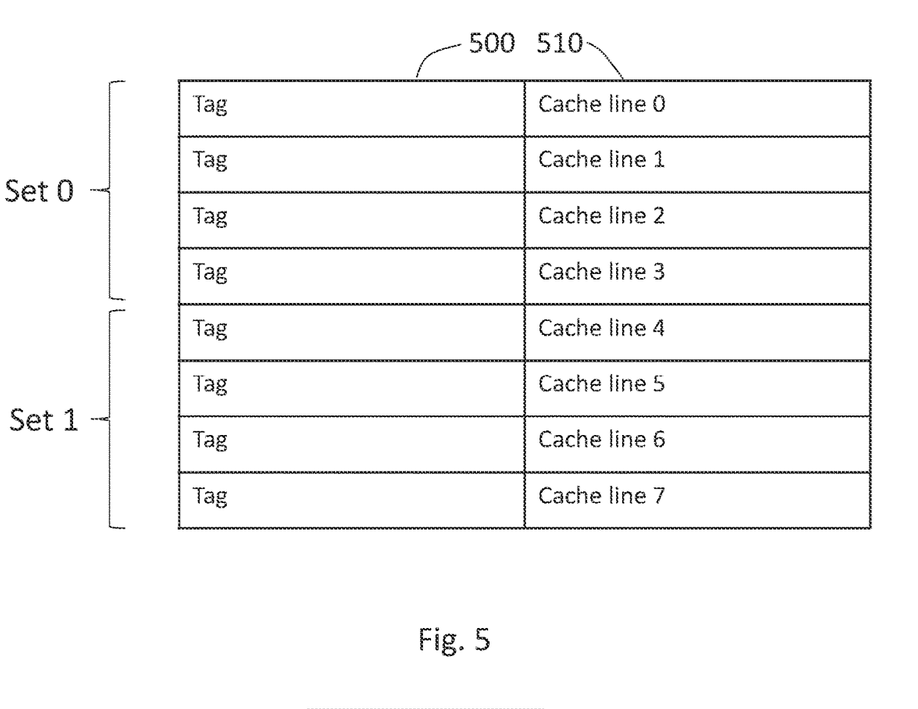
FIG. 5 schematically illustrates a set-associative cache memory.

In an N-way set-associative cache memory each address in main memory can be stored in any of N locations in the cache memory. Generally, each of the cache memory locations or "lines" can store data from any of multiple memory addresses. An example shown in FIG. 5 is of a 4-way set-associative cache memory for which (for clarity of the diagram) only two sets are shown each having four associated cache lines. In use, a memory block is first mapped onto a set such as set 0, set 1 and the like as shown in FIG. 5 and is then placed into any cache line or way of the set. Tag information 500 derived from the memory block address stores information which can be compared with a required memory block address to determine whether or not a particular cache line currently stores the required data. Other information, not shown in FIG. 5, may include a validity flag indicative of the validity or other property of each stored cache line.

Therefore, in these examples, this type of set-associative cache memory provides, for a given cache function: associative data storage 510 to store a cached data item in any of a plurality of cache locations applicable to that cached data item; and tag storage 500 to store tag information indicative of which of the plurality of cache locations stores a given cached data item.

The size of the tag storage for each cache line is related to several factors including the associativity (number of ways) of the cache memory.

In example arrangements, cache lines and tag storage (together as an example of storage elements) can be reallocated from one of the cache memories to another of the cache memories, independence upon any one or more of the factors discussed above.

In some examples, this can be done in such a way as to vary the associativity of at least the cache memory to which the storage elements are reallocated.

For example, consider the situation in which (say) the GPU L2$ is 8-way associative and the L3$ is 16-way associative. A portion of the L3$, for example a portion having the same number of sets as the number of sets in the GPU L2$, can be allocated for use as part of the GPU L2$ so as to render the GPU L2$ as a 24-way associative cache memory. Clearly, in such situations, the amount of storage available for use as the L3$ will be reduced, potentially to 0, by such a reallocation, but in a situation in which the GPU task currently being undertaken would run more efficiently using a higher associativity and/or larger cache memory, it can be advantageous to increase the associativity of the GPU L2$ even at the expense of a reduced size L3$.

This provides an example in which, for a given cache function the storage elements provide associative data storage to store a cached data item in any of a plurality of cache locations applicable to that cached data item; and tag storage to store tag information indicative of which of the plurality of cache locations stores a given cached data item. In examples, for the given cache function: a first group of storage elements are associated with the given cache function as a default cache function; the control circuitry is configured to allocate up to a second group of storage elements to the given cache function so as to increase the number of cache locations applicable to that cached data item; and the tag storage is configured to store tag data applicable to the given cache function including the second group of storage elements.

For example, storage elements having, as a default cache function, a given cache function are arranged to have an associativity of n; and in response to the control circuitry allocating further storage elements to the given cache function, the given cache function is configured to have an associativity of m, where m is greater than n.

For a cache memory a with associativity n, cache b with associativity m, if the control circuitry moves x sets from a to b:

Cache a: associativity=n−x
Cache b: associativity=m+x

In general, amongst two cache memories a and b to take part in this type of reallocation, the cache memories may or may not have the same size, or the same associativity. However, in at least some examples they may have the same or at least similar: (i) cache line size; (ii) Index size (same number of entries in an individual set); (iii) access time (or at least similar access time (which may be associated with at least a similar electrical distance from the relevant connected device); and/or (iv) number of clock cycles required to perform an access. Here, "similar" in this context implies within a threshold range of equality, such as ±10%.

Cache memory is taking part in this type of reallocation scheme may have logic provided as part of their functionality which indicates one or more of (a) the current number of ways supported (so that the control circuitry only tries to access parts of the cache that are available to it); (b) variable length eviction logic (logic which selects which lines to evict and/or replace).

This arrangement provides an example in which, for a given cache function: a first group of storage elements are associated with the given cache function as a default cache function (for example being associated with L2$ as a default cache function); and the control circuitry is configured to allocate up to a second group of storage elements to the given cache function (for example allocating cache lines having a default cache function of L3$ to a given L2$) so as to increase the overall cache size as well as increasing the number of cache locations applicable to that cached data item (in other words, increasing the number of ways or in other words the associativity of that instance of L2$).

In some examples, cache lines can be reallocated from, for example, L3$ to the GPU L2$ but the tag storage associated with the GPU L2$ can be sized at the outset so that it can cope with either the original or default associativity of the GPU L2$ or the increased associativity of the GPU L2$ with the additional storage reallocated from the L3$. This implies a relatively small amount of tag storage which is not needed under the default associativity but avoids the need to reallocate tag storage in order to provide an operable GPU L2$ when the cache lines from the L3$ have been reallocated to the GPU L2$.

In other words, the tag storage at the given cache function is configured to store tag data applicable to the given cache function including the second group of storage elements. This arrangement avoids the need to reallocate tag storage as part of a cache reallocation operation, though of course that is an alternative option.

Therefore, in these examples, storage elements having, as a default cache function, a given cache function (such as L2$) are arranged to have an associativity of n (for example, 8); and in response to the control circuitry allocating further storage elements to the given cache function, the given cache function is configured to have an associativity of m (for example 24), where m is greater than n.

Figure 6:
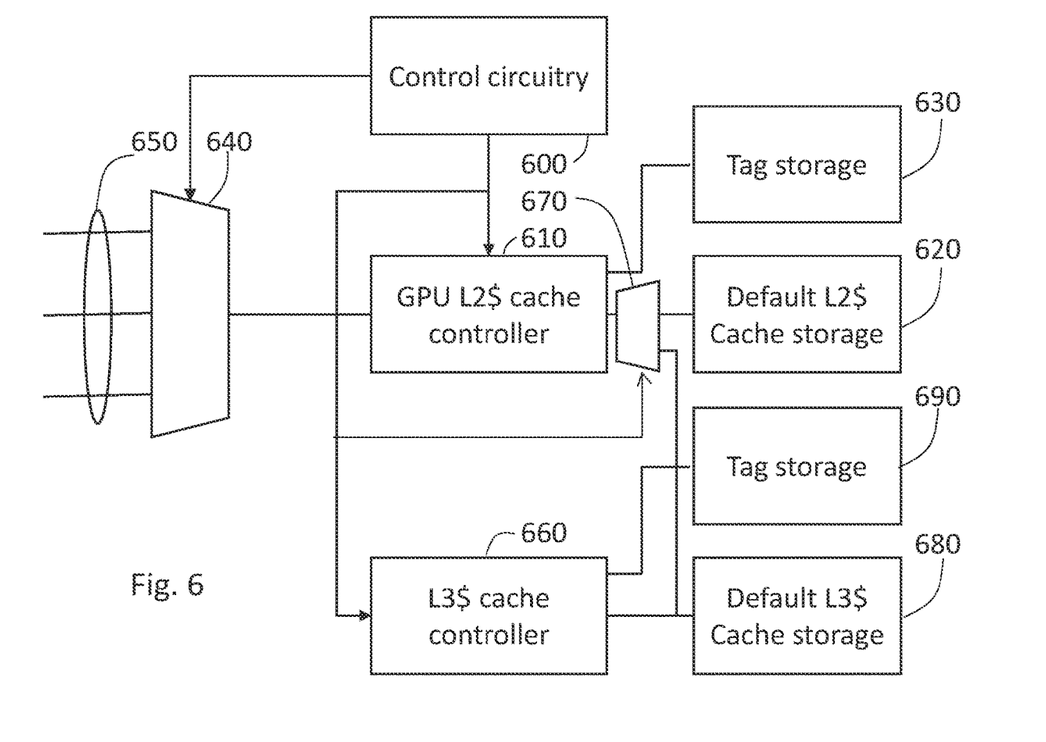
FIGS. 6, 7 and 8 schematically illustrate respective example organisations of the cache memory of FIG. 5.
Figure 7:
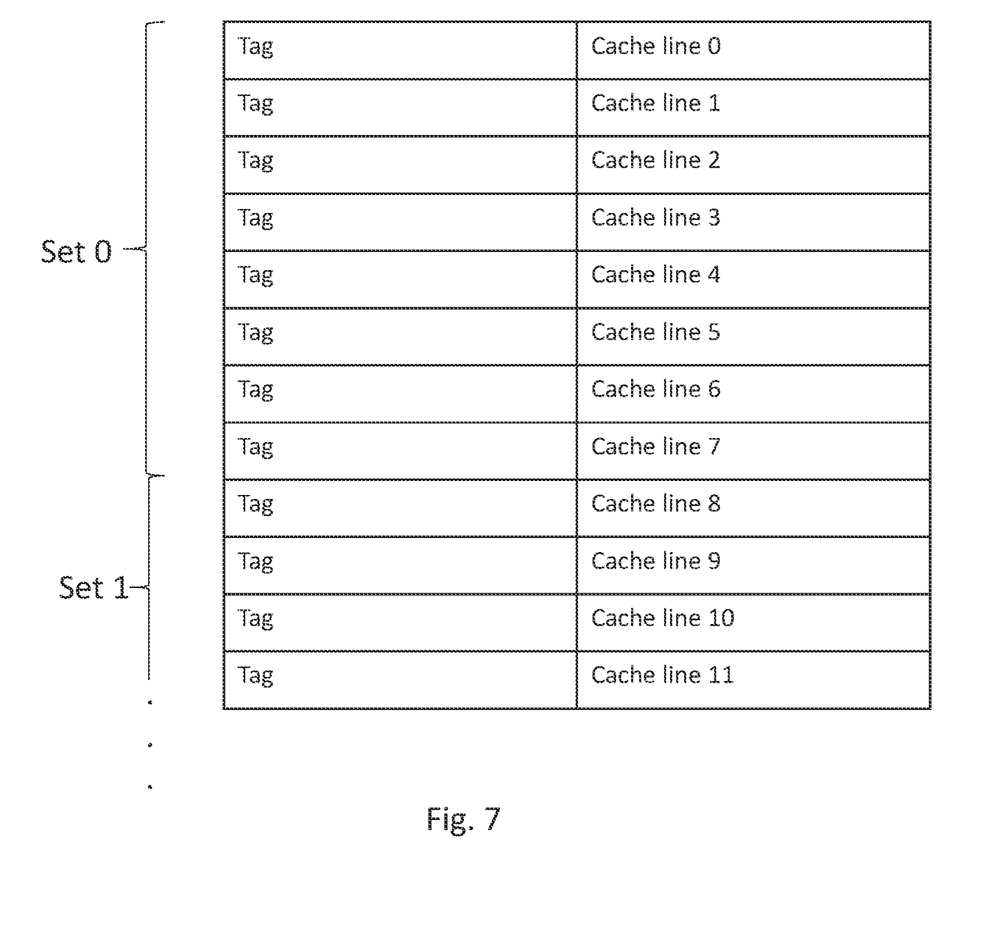

Referring to FIG. 6, an example of an arrangement suitable for performing this functionality is illustrated in which control circuitry 600 performs the functionality of the control circuitry 310 of FIG. 3 in the context of the circuitry of FIG. 6. An L2$ cache controller 610 performs cache control functions such as maintaining the contents of cache storage 620 and associated tag storage 630 applicable to the GPU L2$, dealing with allocations, evictions, misses and the like. Optionally, a multiplexer 640 provides interfaces 650 with various different components (to allow some of the reallocation techniques discussed above) including the GPU in this example.

The control circuitry 600 also communicates with an L3$ cache controller 660 and with routing circuitry 670 shown as a schematic multiplexer to allow communication between the L2$ cache controller 610 and storage 680 having a default allocation as L3$ cache storage. Tag storage 690 applicable to L3$ operation is also provided.

In order to perform the reallocation of cache lines from L3$ to the GPU L2$, the control circuitry 600 controls the routing circuitry 670 to allow communication directly between the L2$ cache controller 610 and the storage 680 as well as the storage 620 and controls the L3$ cache controller not to interact with the storage 680. The tag storage 690 is at least in part redundant or not used in this example because the tag storage 630 is suitably sized to encompass operation including the storage 620 and the storage 680, though in other examples, it could be reallocated to supplement the tag storage 630.

FIG. 7 schematically illustrates the arrangement of FIG. 5, but with the associativity supplemented using the techniques described above, so that in the schematic example of FIG. 7 the associativity has been increased from 4-way (FIG. 5) to 8-way (FIG. 7).

Figure 8:
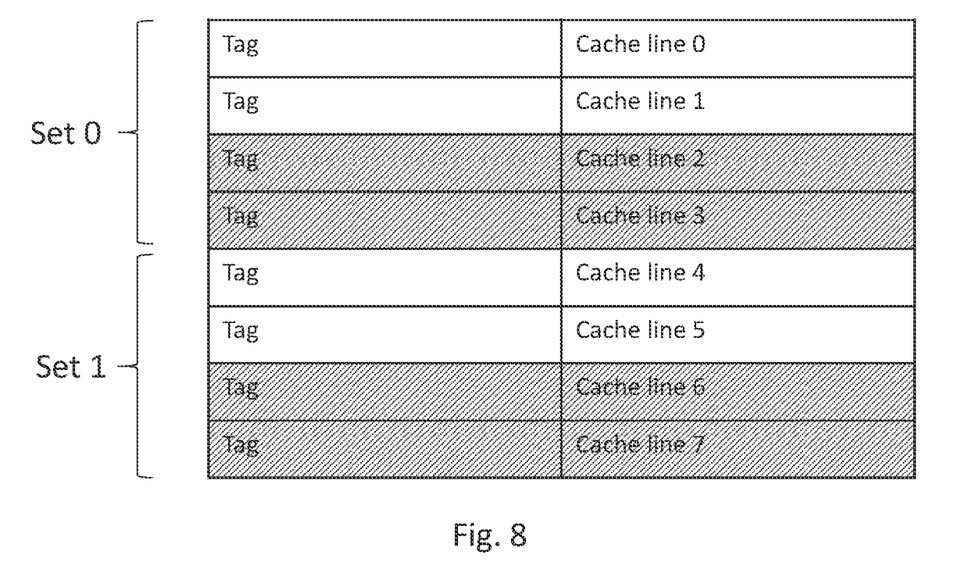

In terms of the effect on the "donor" cache memory storage (L3$ in this example), one example option is that the number of sets is reduced. Another example option is shown in FIG. 8 in which the associativity of the donor cache memory is reduced while maintaining the same number of sets, so that the shaded cache lines are reallocated and are no longer available to the L3$. In other words, the donor cache in this example has been reconfigured from 4-way associative to 2-way associative by the reallocation process. As before, this reconfiguration can be communicated to the L3$ cache controller 660 by the control circuitry 600.

Example GPU Features

Figure 9:
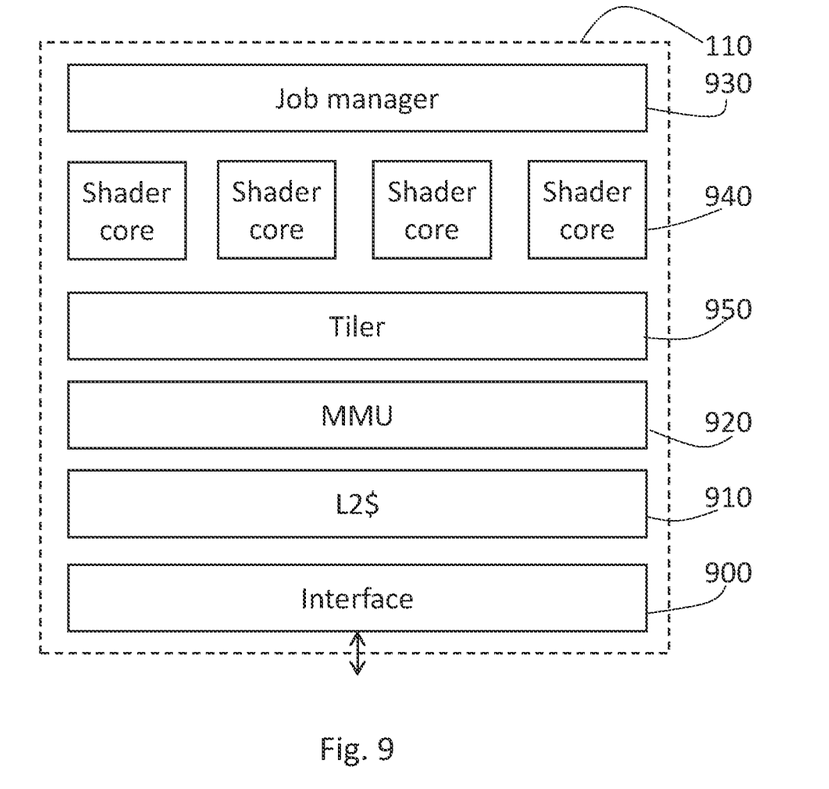
FIG. 9 schematically illustrates a graphics processing unit (GPU)

FIG. 9 schematically illustrates an example structure of the GPU 110, comprising an interface 900 for retrieving data and instructions from the interconnect 130 and providing data such as processing results back to the interconnect 130, and a cache 910 for storing data and/or instructions for input or processed data for output. A memory management unit (MMU) 920 can perform address translation where this is required.

A job manager 930 controls the execution of processing tasks or jobs established by the CPU 100, with the GPU-specific execution been performed by a set of shader cores 940 and tiler circuitry 950.

The shader cores are processing units specifically optimised or designed for handling instructions, for example in the form of shader code in order to manipulate the pixels and polygon vertices within an image so as to render portions of that image.

The tiler circuitry oversees the division of the GPU rendering operations into those corresponding to discrete regions or tiles of the rendered image. This process can reduce the instantaneous memory and data transfer requirements which occur during the rendering process by the GPU 110.

In the drawing of FIG. 9, a group of four shader cores 940 is shown. In practice, a GPU may contain many shader cores, potentially more than four, but in at least some example GPUs the shader cores may be grouped into sets of four which may be arranged using the techniques described here so that each such set of four shader cores may share a level 2 cache 910. In other words, out of a potentially larger provision of level 2 cache storage, portions of it may be allocated to each such set of four shader cores using the techniques described here.

FIGS. 10-15 are schematic flowcharts representing respective methods or part-methods applicable to the present techniques.

Figure 10:
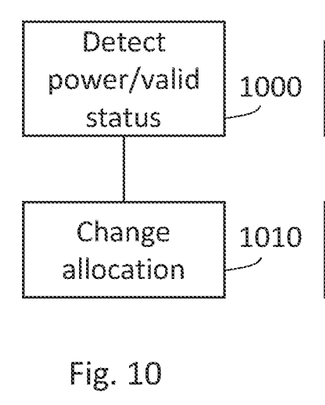
FIGS. 10 to 16 are schematic flowcharts illustrating respective methods.

FIG. 10 relates to operations under the control or influence of the power controller 120. The power controller 120 can control power supply to various power domains which may include the processors 100, 110 or parts of them and may indeed include some or all of the cache memories described with reference to FIG. 1.

In some examples, the control circuitry 310, 600 can act to vary the allocation of storage elements of the cache memories in response to a notification by the power controller that some or all of a processor is powered up or powered down. For example, assuming that a part of the functionality of the GPU processing circuitry 112 is powered down, the GPU level 2 cache memory 116 can be reallocated, for example for use as further level 2 cache memory 106 by the CPU 100 or as further level 3 cache memory (SLC). Therefore, a more sophisticated approach can be taken to power control them in some previous arrangements, which might have powered down the entire GPU 110 potentially wasting the usefulness of the resource provided by the GPU level 2 cache memory 116 which instead (in this example) can be reallocated for another cache function which is to say a potentially useful purpose to be made of it by another processor such as the CPU 100.

In terms of cache reallocation, if a cache or a portion of a cache is powered down then that powered down circuitry may be considered by the control circuitry to be eligible for reallocation once powered up again. Similarly, if a cache or a part of one is reallocated and the relevant line was a powered down or invalidated at the time of reallocation, the cache is powered up and the line(s) allocated to the appropriate target or recipient cache. The control circuitry executing the cache allocation scheme may select the currently powered down or invalidated lines in preference to other cache lines with which to perform the reallocation, so as to potentially reduce the operational impact on the cache lines being usefully employed by the donor cache memory at that time.

Referring to FIG. 10, at step 1000 the control circuitry detects the power and/or validity status of storage elements and at step 1010 performs reallocation on the basis of that detection, for example using the techniques just described.

Figure 11:
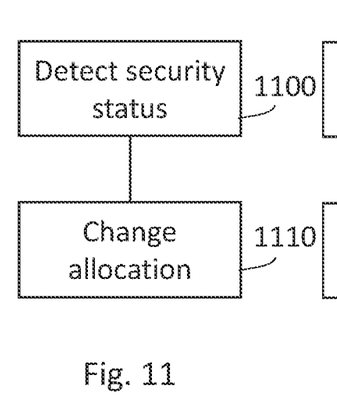

If a cache is reallocated and it contained clean data, then if the cache could contain secure data, but the device to be connected to that cache (following reallocation) does not support secure data, then the secure lines are invalidated. Referring to FIG. 11, at a step 1100 the security status of data currently held by storage elements currently allocated as one type of cache memory is detected and, using for example techniques just described, reallocation is performed at step 1110 on the basis of such a detection.

As mentioned above, the decision to reallocate portions of cache memory storage can be made according to various criteria and/or instructions or indications from any of the processors or the power controller. Some of the example criteria relate to a detection of the operation of the cache memory to which the lines are currently allocated.

Figure 12:
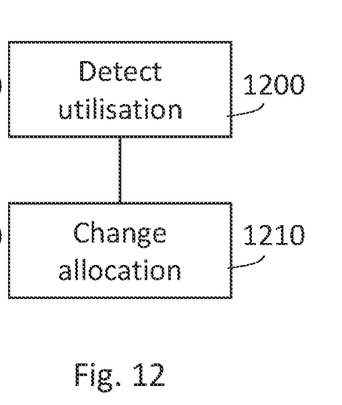

In FIG. 12, the control circuitry detects a utilisation of one or more of the processors and/or one of the cache memories at step 1200 and, at step 1210 may change the allocation of cache memory resources in response to that detection. For example, the detection might be as to whether particular operational components of a processor are in use and/or of a type of program or operation being performed by the processor and/or as to whether the processor is powered down. If a detection is made that a given operational component is not in use or that a processing operation is being performed requiring relatively low processing overhead (such as operating a graphical user interface or GUI), then cache memory can be reallocated away from that processor to provide support to a different processor. On the other hand, if a processor is detected to be performing a particularly onerous or high overhead processing task (such as executing a game programme using fast-changing graphics), or to be making use of a co-processor or the like then cache memory resource can be allocated towards that processor by the control circuitry.

Note that in fact the power control by the power controller 120 could be dependent upon utilisation which would lead to an indirect effect on allocation by virtue of the control circuitry responding to power control operations by the power controller 120.

Figure 13:
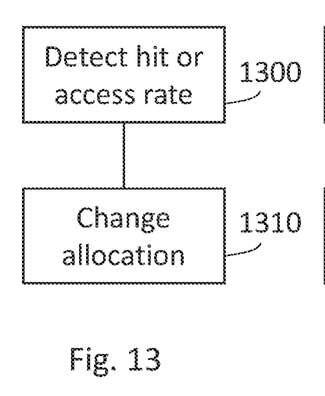

In FIG. 13, the current cache performance itself can be detected at step 1300, for example at which a parameter such as a hit rate or an access rate (or an occupancy) is detected in respect of a given cache memory. If the hit rate is below a threshold rate, then the cache memory under consideration can be augmented by storage elements reallocated from one or more other cache memories. If the hit rate is above a second threshold rate, then resources relating to that cache memory can be reallocated towards other recipient cache memories. At a step 1310 the allocation is changed in response.

For example, amongst two cache memories, if both caches have good hit rates (between first and second thresholds for example) then the control circuitry makes no reallocation. However, if one of the caches has a high miss rate (above a given threshold) and is relatively heavily loaded, and the other cache has a low miss rate (below another given threshold) and/or is not heavily loaded then the control circuitry can alter the allocation is between the two cache memories so as to reallocate storage from the low miss rate or not heavily loaded cache memory to the other of the cache memories.

As well as (or as an alternative to) reallocating in response to the cache hit/miss rate, it is possible to factor in the number of memory accesses and/or cache misses as a cache performance indicator.

For example, if cache A had 90% hit rate and there were 1,000 memory requests in a time period, and cache B had a 90% hit rate and only 10 requests were performed, then:
Cache A: misses=100
Cache B: misses=1

Therefore, cache A is performing many more main memory accesses; which consume a lot of energy and reallocation could be steered to provide additional cache capacity to cache A, potentially at the expense of cache B as a donor cache.

In other words, the control circuitry may be configured to allocate storage elements from a cache function having a higher hit rate to a cache function having a lower hit rate. The hit rate can be a hit rate which indicates a proportion of attempted accesses which hit, or as in the further example discussed above, can be a hit rate indicative of an absolute number of hits in a given period.

For example, the control circuitry may be responsive to a current occupancy of at least one of the cache functions to allocate, to another cache function, one or more storage elements of a cache function for which the current occupancy is below a threshold occupancy.

Regarding cache misses, there are different types of misses:
Compulsory—first time data is accessed
Capacity—data set larger than the cache
Conflict—these misses occur where several blocks are mapped to the same set in the cache In previously proposed arrangements the cache size/associativity is fixed so such designs may just monitor the number of hits/misses. However, in the present examples the cache size/associativity can be modified.

Some masters are impacted by misses in different ways, for example a CPU (control plane) generally does not cope well with misses and may stall (reducing efficiency), whereas a GPU (data plane) is usually designed to cope with misses fairly well. So, the control circuitry could detect the device connected to the cache and also use that as an indicator (average latency, latency, number of hits, number of misses etc.) whether the cache that it is connected to has the appropriate capacity.

One or more cache performance indicators or metrics may indicate a counters indicating number of requests, number of misses and number of hits, number of dirty line writes, and cache line fills.

As the cache size and associativity can be changed, it may be useful to monitor capacity and conflict misses. For example, logic associated with each set may monitor the number of misses to a specific set in a period of time. If this count value is higher than the set associativity of the cache, then this could indicate potential conflict issues such that it may be appropriate for the control circuitry to reallocate some storage, increasing the associativity.

If these counters show that generally there are not any don't have conflict issues, but there is a high miss rate, then perhaps the cache memory is exhibiting capacity misses, in which case the control circuitry may address this by increasing the cache size.

In these examples, allocating more ways to a cache will increase associativity and cache size.

The control circuitry can perform trial reallocations (for example, periodically) and detect the effect on processing efficiency, for example cache hit/miss rate as a result of the trial reallocation. If processing performance deteriorates following the trial reallocation then it can be reversed, for example after a predetermined period such as 10 seconds of operation. If on the other hand processing performance improves then the trial reallocation can be retained as a quasi-permanent reallocation and indeed a further trial reallocation can be applied in addition.

Regarding data currently held by a cache memory, if the control circuitry detects that it is unlikely that the existing data is likely to be used by the device to which the cache memory is to be connected following a reallocation (for example, the detection being made by detecting that the target connected device is different to the current connected device and/or that the target connection relates to operations in a different address space or context to those of the current operation), the entire cache may be evicted and/or invalidated before reallocation is performed. For example, if there is dirty data then the line may be evicted; if the there is no dirty data the line may be invalidated.

In the case of cache memory supporting coherent operation as discussed above, in some examples any coherent cache lines moving (by virtue of a reallocation to be performed) from GPU L2$ to SLC (L3$) are simply moved without being invalidated or changing their coherency status. However, in example arrangements, coherent cache lines moving from L3$ (SLC) to GPU L2$ may be invalidated.

Figure 15:
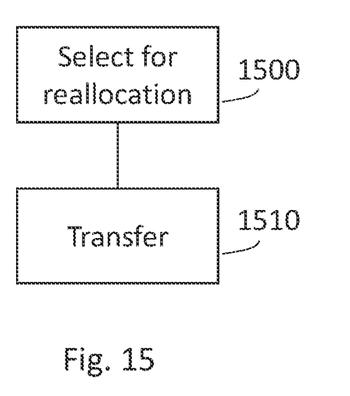

For example, in a system comprising at least two processing circuitries, in which for at least two cache functions, the cache memory storage may be configured to store coherently one or more copies of data so that data written to a memory address in the coherent memory circuitry by one processing circuitry is consistent with data read from that memory address in the coherent memory circuitry by another of the processing circuitries. In some examples such as that represented by a step 1510 below, in response to the control circuitry allocating storage elements from one cache function to another cache function, the storage elements are configured to retain data currently stored by those storage elements.

In at least some examples, whenever possible without causing data inconsistencies, the control circuitry operates so that data stored by a donor cache memory is simply carried over and continues to be stored by a recipient or target cache memory following a reallocation operation.

Regarding dirty data, if a cache is reallocated and it contains dirty data, then if the cache could contain dirty secure data, but the device to be connected to the target or recipient cache memory does not support secure data, the secure lines are written back and invalidated. If the cache could contain secure data, but the device to be connected to the cache memory following reallocation does not support secure data, then non-dirty (clean) secure lines are invalidated. If it is unlikely (for example using the criteria discussed above) that the existing data is likely to be used by the device to be connected to the reallocated cache, the dirty lines may be written back, and the entire cache may be invalidated. Dirty coherent cache lines moving from GPU L2$ to L3$ (SLC) are moved. Dirty coherent cache lines moving from SLC (L3$) to GPU L2$ are written back if they are dirty, and invalidated.

Figure 14:
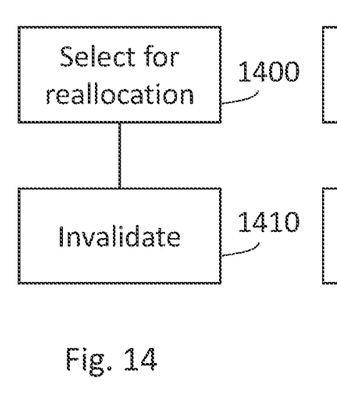

These options are shown schematically in FIGS. 14 and 15. In FIG. 14, one or more cache lines are selected for reallocation by the control circuitry at a step 1400 and are invalidated at step 1410 according to any of the techniques described above. Similarly, in FIG. 15 one or more cache lines are selected for reallocation by the control circuitry at a step 1500 and are simply transferred to the new cache operation at a step 1510 using any of the techniques described above.

In other words, at the step 1410, the control circuitry may be configured to control the invalidation of data currently stored by a storage element to be allocated to a different cache function.

In further examples, the same or similarly sized and similarly performing data cache lines (with similarity in this context being defined as discussed above) could be used as between GPU L2$ and L3$ for example, with the tag storage of the L3$ suitably oversized as discussed above, for example allowing least recently used (LRU) tracking to be used to cope with standard and extended cache sizes. Also, effectively the cache controller in the SLC (L3$) could be oversized to cope with the additional memory capacity.

In some examples, caches are treated mostly independently. The interconnect sends a transaction to both the standard SLC and the extended SLC cache structure (the reallocated portion). Both caches perform their lookups independently. If there is a hit the appropriate cache returns the data. Note: Only one cache can contain the line. If there is a miss, the following can occur: (a) the extended LRU selects which cache to perform the line fill; (b) the cache submits a cache line fill request. To reduce latency, potentially both portions of the cache could submit a cache line fill. In the interconnect if multiple caches miss the line, then the transactions could be merged. The data is only returned to the cache as specified by the replacement policy; the other caches that submitted a request receive a transaction cancelled a response.

As discussed above, an integrated circuit device may comprise the circuitry of FIG. 1 using these techniques, the integrated circuit device being a three-dimensional integrated circuit device having respective components fabricated on two or more overlying substrate layers. For example, the storage elements may be distributed between the two or more overlying substrate layers so that an electrical connection distance between the processing circuitry and the storage elements is substantially the same for storage elements of at least two different default cache functions.

Method Example

Figure 16:
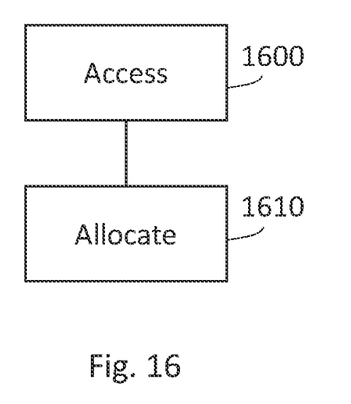

FIG. 16 is a schematic flow chart illustrating a method comprising:

accessing (at step 1600) a hierarchy of at least two levels of cache memory storage; and allocating (at step 1610) storage elements of memory circuitry comprising plural storage elements, at least some of the storage elements being selectively operable as cache memory storage in at least two respective different cache functions, for operation as a given cache memory function.

Such a method may be performed or fulfilled by the apparatus described above.

General Matters

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Circuitry comprising:

processing circuitry to access a hierarchy of at least two levels of cache memory storage;

memory circuitry comprising plural storage elements; and control circuitry to allocate storage elements of the memory circuitry for operation as cache memory storage according to a given cache function, wherein:

the processing circuitry comprises a plurality of processing units;

for a first mode of operation, the control circuitry is configured to allocate at least some of the storage elements to a first cache function for which the at least some of the storage elements are operable as a given hierarchy level of cache memory storage associated with a first processing unit of the plurality of processing units, and for a second mode of operation, the control circuitry is configured to allocate the at least some of the storage elements to a second cache function for which the at least some of the storage elements are operable as the given hierarchy level of cache memory storage associated with a second processing unit of the plurality of processing units instead of being associated with the first processing unit.

2. The circuitry of claim 1, in which the control circuitry is responsive to (i) a default cache function associated with a given storage element; and (ii) receipt of a control indication to request the control circuitry to allocate the given storage element to a cache function different to the default cache function.

3. The circuitry of claim 2, comprising power control circuitry, in which:
the power control circuitry is configured to selectively enable or disable the processing units for operation; and
the power control circuitry is configured to generate the control indication in dependence upon which of the processing units are currently enabled or disabled for operation.

4. The circuitry of claim 3, in which the power control circuitry is configured to selectively enable or disable one or more of the cache levels for operation.

5. The circuitry of claim 1, in which the control circuitry is configured to perform allocation in dependence upon a current utilisation of one or more of the processing units.

6. The circuitry of claim 1, in which the control circuitry is configured to perform allocation in dependence upon a current cache performance.

7. The circuitry of claim 6, in which the control circuitry is configured to allocate storage elements from a cache memory function having a higher hit rate to a cache memory function having a lower hit rate.

8. The circuitry of claim 1, in which, for a given cache level the storage elements provide:
associative data storage to store a cached data item in any of a plurality of cache locations applicable to that cached data item; and
tag storage to store tag information indicative of which of the plurality of cache locations stores a given cached data item.

9. The circuitry of claim 8, in which, for the given cache level:
a first group of storage elements are associated with the given cache function as a default cache function;
the control circuitry is configured to allocate up to a second group of storage elements to the given cache level so as to increase the number of cache locations applicable to that cached data item; and
the tag storage is configured to store tag data applicable to the given cache level including the second group of storage elements.

10. The circuitry of claim 9, in which the first and second groups of storage elements are configured to have the same or similar (i) cache line size; (ii) Index size; (iii) access time; and/or (iv) number of clock cycles required to perform an access.

11. The circuitry of claim 9, in which:
storage elements having, as a default cache function, a given cache memory function are arranged to have an associativity of n;
in response to the control circuitry allocating further storage elements to the given cache memory function, the given cache memory function is configured to have an associativity of m, where m is greater than n.

12. The circuitry of claim 1, in which the control circuitry is responsive to a current occupancy of at least one of cache memory functions to allocate, to another cache memory function, one or more storage elements of a cache memory function for which the current occupancy is below a threshold occupancy.

13. The circuitry of claim 1, in which the control circuitry is configured to control the invalidation of data currently stored by a storage element to be allocated to a different cache memory function.

14. The circuitry of claim 1, comprising at least two processing circuitries;
in which for at least two cache memory functions, the cache memory storage is configured to store coherently one or more copies of data so that data written to a memory address in the coherent memory circuitry by one processing circuitry is consistent with data read from that memory address in the coherent memory circuitry by another of the processing circuitries.

15. The circuitry of claim 14, in which, in response to the control circuitry allocating storage elements from one cache memory function to another cache memory function, the storage elements are configured to retain data currently stored by those storage elements.

16. The circuitry of claim 1, in which the control circuitry is configured to selectively allocate storage elements for operation as cache memory at a given level of the at least two levels of cache memory storage as a respective cache function.

17. An integrated circuit device comprising the circuitry of claim 1, the integrated circuit device being a three-dimensional integrated circuit device having respective components fabricated on two or more overlying substrate layers.

18. The integrated circuit device of claim 17, in which the storage elements are distributed between the two or more overlying substrate layers so that an electrical connection distance between the processing circuitry and the storage elements is substantially the same for storage elements of at least two different default cache levels.

19. A method comprising:
accessing, by processing circuitry, a hierarchy of at least two levels of cache memory storage; and
allocating storage elements of memory circuitry comprising plural storage elements for operation as cache memory storage according to a given cache function, wherein the processing circuitry comprises a plurality of processing units;
for a first mode of operation, allocating at least some of the storage elements allocated to a first cache function for which the at least some of the storage elements are operable as a given hierarchy level of cache memory storage associated with a first processing unit of the plurality of processing units; and
for a second mode of operation, allocating the at least some of the storage elements to a second cache function for which the at least some of the storage elements are operable as the given hierarchy level of cache memory storage associated with a second processing unit of the plurality of processing units instead of being associated with the first processing unit.

* * * * *